T. J. HUBBELL.
Sieve-Protectors for Thrashing-Machines.
No. 225,608.  Patented Mar. 16, 1880.
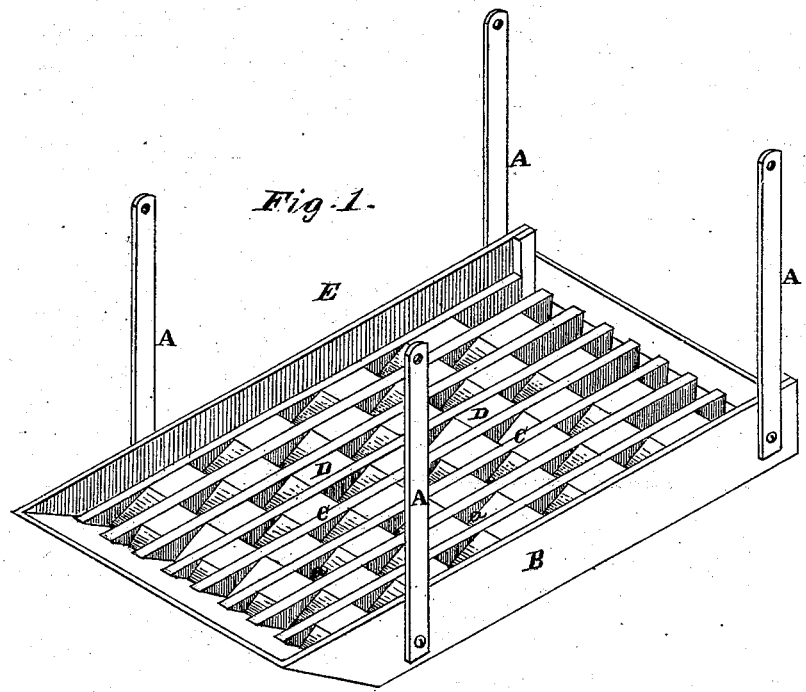
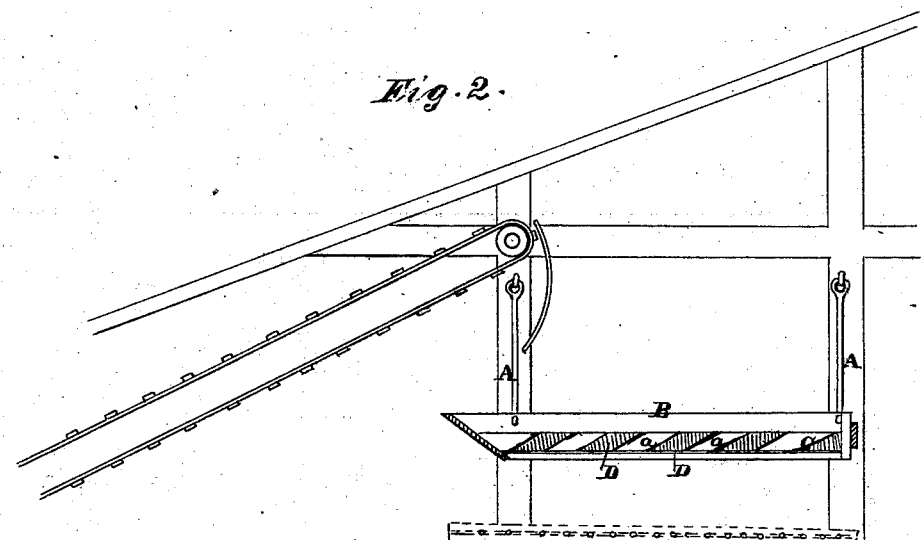

UNITED STATES PATENT OFFICE.

THOMAS J. HUBBELL, OF PESCADERO, CALIFORNIA.

SIEVE-PROTECTOR FOR THASHING-MACHINES.

SPECIFICATION forming part of Letters Patent No. 225,608, dated March 16, 1880.

Application filed December 2, 1878.

*To all whom it may concern:*

Be it known that I, THOMAS J. HUBBELL, of Pescadero, county of San Mateo, and State of California, have invented an Improved Sieve-Protector for Thrashing-Machines; and I do hereby declare the following to be a full, clear, and exact description thereof.

My invention relates to a novel attachment for thrashing-machines, by which I am enabled to greatly increase the capacity and efficiency of the cleaning-sieves, or the "shoe," as it is termed; and it consists in the employment of a peculiar guard or protector, which is suspended directly above the shoe, so as to receive the grain, chaff, and what straw may fall from the carrying-belt, and which usually falls directly upon the sieves.

In ordinary machines the greater bulk of the long straw is carried away over the tail of the machine by the straw-carrier; but the great majority of the chaff and some of the straw will pass down upon the sieves with the grain, and it falls in such a quantity that it is very difficult for the best cleaning-shoes to properly dispose of the amount of grain which the machine is capable of thrashing.

My guard or protector is intended to receive the mass as it falls from the draper or carrying-belt and distribute it, cleaning away also the most of the straw and chaff by an independent shaking device, so that the sieves in the shoe can act much more perfectly.

Referring to the accompanying drawings, Figure 1 is a view of my device. Fig. 2 shows a section of the same.

The shoe or shaking portion of a thrashing-machine, in which the grain is separated from the chaff and refuse, is hung so that it may be oscillated by power suitably applied, and is furnished with riddles or sieves, the grain, &c., under treatment being subjected to a blast of air from a rotary fan. As the grain, straw, &c., falls onto the shoe the sieves are apt to become clogged by a mass being poured onto it, and by pieces of straw, &c., getting into the sieve and stopping it up.

Various devices have been tried for preventing the clogging of these sieves, since as soon as they clog a perfect separation of the grain is impossible.

By my method clogging of the sieve is not likely to occur, for the reason that the straw and bulkier substances liable to clog the screens do not come to the sieves, or if they do they come in a position so as to be easily carried away by the air-blast.

The shoe of the separator is shown in dotted lines in Fig. 2 at G, with the ordinary fan or blower at H.

The construction and arrangement of these parts are not materially different from those heretofore used, and they are shown in order to indicate the relative position of the sieve-protector to said parts.

Over the shoe of the separator is suspended independently, by hangers A, the bottomless box or frame B, arranged so as to have an end-shake motion. In this box or frame is fitted the sieve-protector E, which is formed of longitudinal strips C and beveled blocks D, the blocks and strips alternating, as shown.

I make the strips preferably of sheet-iron, and attach the blocks to the strips in any suitable manner, so as to form alternate surfaces and openings *a*.

I have found the simplest manner to form my protector to be as follows: The blocks D are sawed out in the form of a rhomboid, and the first metallic strip C is nailed to a row of the blocks, leaving proper spaces between and making up the desired length. Another strip is nailed upon the opposite parallel sides of the blocks, then another series of blocks are nailed to this strip, then a third strip, thus alternating until the proper width is obtained, when the protector will consist of parallel strips of thin metal with intervening blocks having nearly square surfaces and inclined openings between them of nearly equal size with the surfaces. The rows of blocks are so placed between the strips that the openings in each row fall opposite the blocks of the adjacent rows. The whole surface then consists of blocks and spaces situated diagonally to each other, and of about equal area, thus forming a perfectly smooth surface having sufficient openings, through which the grain is allowed to fall upon the sieve. These openings incline backward and tend to prevent any straw from falling through, while the end-shaking motion causes the straw to move rapidly off to the rear. These openings, further, are so inclined and in such relation to the sieve and fan, as shown in Fig. 2, that the blast is driven directly through said openings, so that if any of the straw in falling strike upon end on the incline of the opening it will be turned outward by the blast of air directed through the said openings, while the heavier grain is permitted to fall upon the sieve.

The peculiar construction and arrangement of the blocks and openings render it almost impossible for any straw to fall through the protector under the conditions described, as the forward upper edge of each block projects to or over the rear lower edge of the next succeeding block, so that any of the straw which falls endwise must strike either on the flat surface or upon the inclined surface of one of the blocks. In the latter case, as has been explained, it is turned outward by the blast driven directly through the openings. The sieves will thus be relieved of a great mass of straw and will not become clogged, and their duty will be largely increased.

The shoe containing the sieves may have either a side shake or an end shake, as desired, and is operated independently of the protector.

The specific object of my sieve-protector is to detain and break up the mingled mass falling on it until the blast, traversing the sieve upward, may act on the distributed material to remove the chaff, or so large a part of it as mainly to relieve the sieves below of the task.

My sieve-protector permits no direct downward escape of the grain, which, moreover, must pass through in opposition to the blast. The smooth upper surface also permits the material to slide easily over it, and has also a sufficient imperforate area to check, break up, and spread out the material, in which the checkered arrangement of the perforations assists, as each is separated from all the others by imperforated spaces. In these two particulars, and in the fact that the rhomboidal blocks afford strictly rigid connections between the strips, and by their relative arrangement form diagonal braces, the sieve-protector differs essentially from one constructed of sheet metal, which would catch and detain the material on its edges, would furnish a greater area of perforations than desired, and could not be rendered rigid without an additional frame or brace.

I am aware that sieves or screens for separators have been made of strips of thin metal with short transverse strips placed between them with the edges uppermost; and I am also aware that a screen consisting of notched inclined plates has been used in the same shoe with the sieves; and I am also aware that a sieve made of board perforated with inclined holes suited to the passage of the grain is not new. I do not therefore claim, broadly, these devices; but What I do claim as new, and desire to secure by Letters Patent, is—

1. The described sieve-protector E, made of longitudinal strips C and blocks D, said blocks having plain upper surfaces approximately of the same area as the spaces, and arranged opposite adjacent spaces, forming a checkered surface, as shown, the upper edge of each block projecting to or overlapping the lower edge of the next block, all as set forth.

2. The sieve-protector E, composed of rhomboidal blocks and of thin strips nailed thereto, the blocks having plain upper surfaces, and being arranged to form, with the spaces, a checkered surface, all as set forth.

In witness whereof I have hereunto set my hand.

THOMAS J. HUBBELL.

Witnesses:
FRANK A. BROOKS,
CHAS. G. YALE.